United States Patent [19]

Maruhashi et al.

[11] Patent Number: 4,919,984
[45] Date of Patent: Apr. 24, 1990

[54] MULTILAYER PLASTIC CONTAINER

[75] Inventors: Yoshitsugu Maruhashi; Tamio Asai; Setsuko Iida, all of Yokohama; Sadao Hirata, Kamakura, all of Japan

[73] Assignee: Toyo Seikan Kaisha, Ltd., Tokyo, Japan

[21] Appl. No.: 256,146

[22] Filed: Oct. 7, 1988

Related U.S. Application Data

[63] Continuation of Ser. No. 93,130, Sep. 2, 1987, abandoned, which is a continuation of Ser. No. 746,026, Jun. 18, 1985, abandoned.

[30] Foreign Application Priority Data

Jun. 21, 1984 [JP] Japan .................. 59-126371
Apr. 30, 1985 [JP] Japan .................. 60-91128

[51] Int. Cl.$^5$ .................. B65D 81/26; B32B 27/14
[52] U.S. Cl. .................. 428/36.4; 206/204;
206/524.3; 426/127; 428/36.7; 428/327;
428/480; 428/516; 428/520; 428/522
[58] Field of Search .............. 428/516, 520, 522, 327,
428/349, 36.7, 35.4, 36.4, 480; 206/204, 524.3;
426/127

[56] References Cited

U.S. PATENT DOCUMENTS

| 4,181,637 | 1/1980 | Busch et al. ................ 428/532 |
| 4,314,558 | 2/1982 | Korpman ..................... 206/265 |
| 4,407,897 | 10/1983 | Farrell et al. ............... 428/35 |
| 4,425,410 | 1/1984 | Farrell et al. ............... 428/35 |
| 4,522,775 | 6/1985 | Briggs et al. ................ 264/173 |
| 4,525,527 | 6/1985 | Takeda et al. ................ 428/500 |

*Primary Examiner*—James J. Seidleck
*Attorney, Agent, or Firm*—Sherman and Shalloway

[57] ABSTRACT

An improvement in a packaging multilayer plastic container comprising a gas-barrier interlayer of an ethylene/vinyl alcohol copolymer and an inner and an outer layer of a moisture-resistant thermoplastic resin such as a polyester sandwiching the interlayer. An intermediary layer comprising particles of a high water-absorbing resin dispersed in a resinous medium is provided between the gas-barrier layer and each of the inner and outer layers. Crosslinked polyacrylic acid or its salt or a vinyl alcohol/acrylic acid (salt) block copolymer, for example, may be used as the highly water-absorbing resin. Because of its high saturation moisture absorption at high temperatures, the highly water-absorbing resin is effective for preventing degradation of the gas-barrier property of the ethylene/vinyl alcohol copolymer during retorting.

16 Claims, 2 Drawing Sheets

MULTILAYER PLASTIC CONTAINER

This application is a continuation, of application Ser. No. 093,130 filed 9/2/87, now abandoned, which in turn is a continuation of U.S. Ser. No. 746,026 filed 6/18/85, now abandoned.

BACKGROUND OF THE INVENTION:

1. Field of the Invention

This invention relates to an improvement in a packaging multilayer plastic container comprising an interlayer of an ethylene/vinyl alcohol copolymer and an inner and an outer layer of a moisture-resistant thermoplastic resin. Particularly, it relates to an improvement of the aforesaid container for enhanced preservability under high humidity conditions and for increased adaptability to hot filling and heat-sterilization retorting after filling.

2. Description of the Prior Art

Ethylene/vinyl alcohol copolymer is one of those resins which have the best resistance to permeation to gases such as oxygen, and by utilizing this characteristic, has found extensive use in the fields of packaging containers such as bottles or cups or films. The ethylene/vinyl alcohol copolymer has the defect that it is sensitive to humidity, and at a high humidity of, for example, 100% RH, its coefficient of oxygen permeation becomes higher by about one order of magnitude. In order to remedy this defect, it has been the widespread practice to decrease the effect of humidity on the ethylene/vinyl alcohol copolymer by sandwiching a gas-barrier layer containing the ethylene/vinyl alcohol copolymer with an inner and an outer surface layer of a low water-absorbing resin such as polyethylene and polypropylene to provide a laminated structure.

With this laminated structure, direct contact of the ethylene/vinyl alcohol copolymer with water or moisture can be avoided, but moisture which permeates through the moisture-resistant resin layers exerts an unnegligible effect. For example, it is known that the gas-barrier property of the ethylene/vinyl alcohol copolymer is markedly reduced when the resulting container is heat-sterilized for increased preservability after an article is filled in it and the container is sealed.

Since the degraded gas barrier property cannot be restored even when the ethylene/vinyl alcohol copolymer is again dried, it is believed to be due to the impairment of the hydrogen bond between the polymer chains as a result of the copolymer undergoing the effects of both heat and humidity.

In addition, the production of containers of this type involves a problem of reutilizing scraps. The production of packaging containers from the aforesaid laminate necessarily generates scraps, for example burrs formed by pinch-off in blow molding of bottles or the like, and punching wastes in cup molding. Re-utilization of such scraps becomes necessary in order to save resources. The scraps, because of the aforesaid laminated structure, are composed of a blend of the ethylene/vinyl alcohol copolymer and the low water-absorbing resin. It is the usual practice to interpose this blend between the moisture-resistance resin layer and the ethylene/vinyl alcohol copolymer layer in the production of containers of the aforesaid multilayer structure. However, the use of the scraps leads to molded articles having very inferior properties, and it has been observed that the resulting articles are extremely reduced in, for example, gas-barrier property, mechanical properties such as strength, elongation and impact strength, flavor characteristics and outside appearance characteristics.

Recently, it was proposed, for example in U.S. Pat. No. 4,407,897, to provide a layer of a resin composition containing a desiccant between the moisture-resistant resin layer such as a polyolefin and the ethylene/vinyl alcohol copolymer layer. However, the desiccant generally has low moisture absorption at high humidities, and is not entirely satisfactory for the purpose mentioned.

SUMMARY OF THE INVENTION

It is an object of this invention therefore to provide a container by remedying the various defects of the conventional multilayer plastic containers described above.

Another object of this invention is to provide a multilayer plastic container in which the deleterious effects of moisture on an ethylene/vinyl alcohol copolymer layer can be removed not only during storage but also in retorting or hot filling.

Still another object of this invention is to provide a multilayer plastic container which can be produced by re-utilizing scraps comprising a blend of an ethylene/vinyl alcohol copolymer and a moisture-resistant resin generated in the production of multilayer plastic containers, without a degradation in the various properties of the container.

According to this invention, there is provided a multilayer plastic container for packaging formed of a laminate comprising a gas-barrier layer containing an ethylene/vinyl alcohol copolymer and an inner and an outer surface layer of a moisture-resistant thermoplastic resin provided so as to sandwich the gas-barrier layer, said laminate further comprising an intermediary layer between the gas-barrier layer and each of said moisture-resistant resin layers, said intermediary layer containing particles of a highly water-absorbing resin dispersed in a layer-formable, particularly thermoformable, resin medium.

According to this invention, there is also provided a multilayer plastic container of the above structure, in which the aforesaid layer-formable, particularly thermoformable, resin medium is a blend of an ethylene/vinyl alcohol copolymer and a moisture-resistant resin.

The invention also provides a multilayer plastic container of the aforesaid structure, in which a laminated structure composed of a layer of a composition containing particles of the highly water-absorbing resin in the layer-formable resin medium and a plurality of moisture-resistant thermoplastic resin layers sandwiching the layer of said composition is present on at least one side of the gas-barrier layer.

DETAILED DESCRIPTION OF PREFERRED EMBODIMENTS

Figure 1:
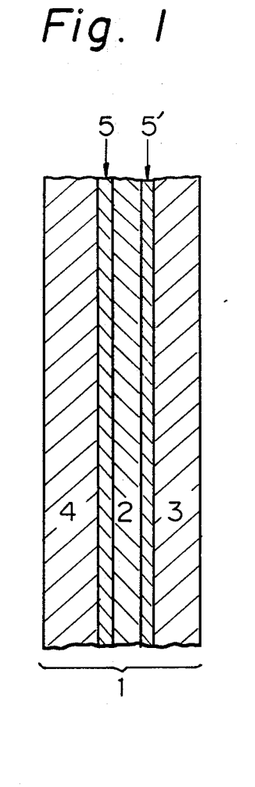
FIG. 1 is a view showing one embodiment of the sectional structure of the plastic container of the invention.

In FIG. 1 showing one example of the sectional structure of the packaging multilayer plastic container of this invention, the wall 1 of the container is composed of a gas-barrier layer 2 containing an ethylene/vinyl alcohol copolymer, and an inner surface layer 3 and an outer surface layer 4 of a moisture-resistant resin provided so as to sandwich the gas-barrier layer. According to this invention, intermediary layers 5 and 5' containing particles of a high water-absorbing resin dispersed in a layer-formable, particularly thermoformable, resin medium are provided respectively between the gas-barrier layer and the moisture-resistant resin layers 3 and 4.

The present invention is based on the finding that by providing the layers 5 and 5' containing the highly water-absorbing resin particles between the ethylene/vinyl alcohol copolymer layer 2 and the moisture-resistant resin layers 3 and 4, the deleterious effects of moisture on the ethylene/vinyl alcohol copolymer are circumvented not only during storage, but also in retorting or hot filling, and consequently, the reduction of the gas-barrier property of the container is markedly inhibited.

When a packaging container composed of a laminated structure of ethylene/vinyl alcohol copolymer (to be sometimes abbreviated as EVOH) is retorted, for example at 120° C. for 30 minutes, it is noted that the coefficient of oxygen permeation of the packaging container after retorting becomes as high as 30 times that of the untreated container even when the EVOH layer is sandwiched by layers of a moisture-resistant resin such as polypropylene. This is presumably because under such severe conditions, the coefficient of steam permeation of the moisture-resistant resin becomes exceedingly high, and the EVOH layer is exposed to high temperatures in the presence of steam and undergoes changes (for example, loss of intramolecular hydrogen bonds) in its internal chemical structure such as blanching or gellation. In contrast, when an intermediary layer containing the highly water-absorbing resin particles is provided between the EVOH layer and the moisture-resistant layer, steam which has permeated through the moisture-resistant resin is selectively absorbed by the highly water-absorbing resin. As a result, the permeated steam during retorting can be effectively prevented from irreversibly reducing the gas-barrier property of the EVOH layer. In fact, as will be shown in a working example given hereinbelow, the oxygen permeability of the retorted multilayer container of this invention is kept within 12 to 2 times that of the unretorted container. This is an unexpected advantage of the present invention.

The highly water-absorbing resin is defined as a resin which is essentially water-insoluble and has the ability to absorb several tens of times to several hundred times (for example, 20 to 1000 times) its own weight of water. Generally, the highly water-absorbing resin has an ionizable group and/or a hydroxyl group which contributes to water absorbability, and a network or crosslinked structure or a gelled structure for rendering the resin water-insoluble.

Examples of the highly water-absorbing resin include starch or cellulose grafted derivatives such as acrylic acid (salt) grafted starch, a hydrolyzate of acrylonitrile grafted starch or acrylic acid (salt) grafted cellulose; crosslinked polyacrylic acid (salt), particularly a copolymer of acrylic acid (salt) with a polyfunctional monomer such as divinylbenzene or a hydrophobic monomer such as styrene or acrylic esters; a vinyl alcohol/acrylic acid (salt) block copolymer produced by saponifying a copolymer of vinyl acetate with an acrylic ester; and modified polyvinyl alcohol obtained by reacting polyvinyl alcohol with an acid anhydride such as maleic anhydride or phthalic anhydride to introduce a carboxyl group and a crosslinked structure simultaneously into the side chain. In these resins, the starch, cellulose or polyvinyl alcohol component acts to insolubilize the polyacrylic acid component and maintain it in the gelled state.

All of these highly water-absorbing resins can be used in the present invention. The crosslinked polyacrylic acid (salt) is especially preferred, and is available under trade names AQUAKEEP 4S and AQUAKEEP 10SH from Seitetsu Chemical Co., Ltd. Another suitable example is the vinyl alcohol acrylic acid (salt) block copolymer which is marketed under trade name SUMIKAGEL 5S by Sumitomo Chemical Co., Ltd.

These highly water-absorbing resins do not have thermoformability by themselves as is clearly seen from their composition and structure mentioned above. According to this invention, the highly water-absorbing resin can be laminated by, for example, co-extrusion, if it is dispersed in the form of minute spherical particles or minute flaky particles in a layer-formable, particularly thermoformable, resin. This is a marked advantage of the present invention.

The highly water-absorbing resins used in this invention show outstanding characteristics not seen in ordinary desiccants when used in the above application. Specifically, the highly water-soluble resin used in this invention is characterized by having a much higher saturation moisture absorption at high temperatures or high humidities than the desiccant. For example, silica, a typical example of the desiccant, shows a saturation moisture absorption of only less than 40% at a temperature of 40° C. (a humidity of 95% RH), whereas the highly water-absorbing resin used in this invention has a saturation moisture absorption of about 160% which is about 4 times as high as that of silica. This tendency increases with increasing temperature. At a relative humidity of 95% (temperature 20° C.), the saturation moisture absorption is on the order of about 30%, whereas the highly water-absorbing resin used in this invention has a saturation moisture absorption of about 100% which is about 3 times as high as the former.

The very high saturation moisture absorption of the highly water-absorbing resin under high temperature and humidity conditions means that during retorting or hot filling, the ethylene/vinyl alcohol copolymer can be effectively protected from degradation of its gas-barrier property. In the heat-sterilization (retorting) of sealed packages, temperatures of 100° to 150° C. are used depending upon the type of the contents or the retorting time, and temperatures of 70° to 99° C. are used for hot filling. Since the humidity inside the package may be considered as RH 100%, the ethylene vinyl alcohol copolymer directly undergoes the effects of the high temperature and the moisture which has permeated through the moisture-resistant resin layers (at high temperatures, the moisture permeability becomes higher). By contrast, according to this invention, the highly water-absorbing resin interposed between the ethylene/vinyl alcohol copolymer layer and the moisture-resistant resin layer shows a very high saturation moisture absorption under high temperature and humidity conditions. Hence, the moisture which has permeated through the moisture-resistant resin is mostly captured by the highly water-absorbing resin, and a degradation in the gas barrier property of the ethylene/vinyl alcohol copolymer can be inhibited.

Another advantage of the highly water-absorbing resin used in this invention is that it has high water holding property, and the pressure dependence of its water holding property is small. Specifically, the highly water-absorbing resin particles, even when dispersed in a layer-formable, particularly thermoformable, resin medium, has high moisture absorbing or water holding property, and gradually releases moisture even when holding a large amount of moisture.

The amount of the highly water-absorbing resin included in the layer-formable, particularly thermoformable, resin medium is determined such that it can be thermoformed for example by melt extrusion and can effect satisfactory shielding of moisture. Desirably, the highly water-absorbing resin is included in an amount of 40 to 2% by weight, particularly 35 to 5% by weight, based on the total weight of the intermediary layer. Desirably, the highly water-absorbing resin has a particle diameter of not more than 2000 microns, particularly not more than 1000 microns.

Any thermoformable thermoplastic resin may be used as the thermoformable resin medium in which to disperse the highly water-absorbing resin. It is the general practice to provide an intermediary adhesive resin layer to bond the moisture-resistant resin layer and the ethylene/vinyl alcohol copolymer layer, and to provide an intermediary layer of a resin blend (scrap) in order to re-utilize the scrap. The highly water-soluble resin is usually included in such intermediary layers. Details of this feature will be described hereinbelow.

A saponified copolymer obtained by saponifying an ethylene/vinyl acetate copolymer having an ethylene content of 20 to 60 mole %, especially 25 to 50 mole %, to a saponification degree of at least 96 mole %, especially at least 99 mole %, may be used as the ethylene/vinyl alcohol copolymer in this invention. The ethylene/vinyl alcohol copolymer should have a molecular weight sufficient for film formation, and desirably has a viscosity of generally at least 0.01 dl/g, especially at least 0.05 dl/g, when measured at 30° C. in a phenol/water mixed solvent (85:15).

The moisture-resistant resin (low water-absorbing resin) may be a thermoplastic resin having a water-absorption, measured in accordance with ASTM D570, of not more than 0.5%, particularly not more than 0.1%. Typical examples of such thermoplastic resins are olefinic resins such as low-, medium- or high-density polyethylene, isotactic polypropylene, ethylene/propylene copolymer, polybutene-1, ethylene/butene-1 copolymer, propylene/butene-1 copolymer, ethylene/propylene/butene-1 copolymer, ethylene/vinyl acetate copolymer, ionically crosslinked olefinic copolymers ionomers), and blends of these resins. Other important examples of the moisture-resistant resins are thermoplastic polyester resins, particularly polyethylene terephthalate, polyethylene terephthalate/isophthalate, polytetramethylene terephthalate, polyethylene/tetramethylene terephthalate, and polybisphenol A terephthalate/isophthalate. Polycarbonate resins may also be used.

Sometimes sufficient adhesion cannot be obtained between the ethylene/vinyl alcohol copolymer and the moisture-resistant thermoplastic resin at the time of lamination. In this case, an adhesive resin layer is interposed between the two.

Such an adhesive resin may be a thermoplastic resin which contains in the main or side chain 1 to 700 milliequivalents (meq)/100 g of resin, especially 10 to 500 meq/100 g of resin, of the carbonyl group based on a carboxylic acid, a carboxylic acid anhydride, a carboxylic acid salt, a carboxylic acid amide, a carboxylic acid ester, etc. Suitable examples of the adhesive resin include ethylene/acrylic acid copolymer, ionically crosslinked olefin copolymers, maleic anhydride grafted polyethylene, maleic anhydride grafted polypropylene, acrylic acid grafted polyolefins, ethylene/vinyl acetate copolymer, copolyesters, and copolyamides, taken either singly or in combination. These resins are useful for lamination by co-extrusion or sandwich lamination. A thermosetting adhesive resin such as an isocyanate-type or epoxy-type resin may be used as an adhesive layer for a film of the ethylene/vinyl alcohol copolymer and a film of the moisture-resistant resin which are prepared in advance.

According to one embodiment of this invention as shown in FIG. 1, the highly water-absorbing resin is dispersed in such an adhesive resin, and the intermediary layers 5 and 5' are caused to act concurrently as the adhesive layer.

According to another preferred embodiment of this invention, the highly water-absorbing resin is included in the scrap generated during container production, namely the blend of ethylene/vinyl alcohol copolymer (EVOH) and a low water-absorbing thermoplastic resin (LMR). As already pointed out above, the re-utilization of the blend of EVOH and LMR (scrap) markedly degrades the various properties of the resulting container. The present inventors made extensive investigations to determine the cause of this degradation, and obtained the following information. Specifically, EVOH has water absorbing property. Thus, the blend, especially its scrap, has absorbed some water since it is necessarily placed in the atmosphere. In the melt-extrusion of the blend of ethylene/vinyl alcohol copolymer and the low water-absorbing resin, the ethylene/vinyl alcohol copolymer in the blend is placed under special conditions unlike the case of extruding the ethylene/vinyl alcohol copolymer alone. In a molten flow of this blend, the EVOH copolymer disperses in a sea-island pattern in a continuous phase of the low water-absorbing resin such as a polyolefin, or, as already suggested by the present inventors, is distributed in a thin layer. Moreover, water in the blend is adsorbed to the ethylene/vinyl alcohol copolymer having the aforesaid distributed structure, and the copolymer is surrounded with the hydrophobic resin medium. In addition, the ethylene/vinyl alcohol copolymer is susceptible to thermal degradation as compared with other resins such as polyolefins although it can be melt-molded. Accordingly, with the blend which has been subjected to a blending step such as pelletization, particularly its scrap which has experienced melt molding, the thermal degradation of the resin has already proceeded. When this ethylene/vinyl alcohol copolymer having a tendency to thermal degradation is subjected to heat in the presence of water, its thermal degradation proceeds acceleratingly. In other words, the present inventors found that in the remelting of the ethylene/vinyl alcohol copolymer which has experienced melting, water acts as a catalyst for thermal degradation. Furthermore, because in the melting of the blend, the ethylene/vinyl alcohol copolymer containing water is exposed to the melting temperature while it is confined in the form of fine particles or a layer in the hydrophobic resin, the EVOH copolymer undergoes the influence of heat under conditions similar to autoclaving. Consequently, gellation, conversion to a rubbery state, foaming, etc. occur in the copolymer to cause various troubles, for example a reduction in gas-barrier property, a reduction in strength, elongation and impact strength, a reduction in flavor owing to the smell of the decomposition products of the resin, or poor appearance caused by coloration, foaming, etc.

As stated hereinabove, according to the present invention, the aforesaid troubles are removed by incorporating into the EVOH blend the highly water-absorbing resin which has a high saturation moisture absorption at high temperatures. As a result, the present invention has made it possible to re-utilize the scrap of the EVOH containing blend, which has been difficult to use heretofore, for molding into containers, films or sheets.

In the blend used in this invention, the ethylene/vinyl alcohol copolymer (EVOH) and the low water-absorbing thermoplastic resin (LMR) may be present in arbitrary ratios. In the scrap of the blend generated as a by-product during molding, the EVOH/LMR ratio is from 1:2000 to 1:3 by weight, and the amount of the low water-absorbing resin is considerably in excess of that of EVOH.

This blend may contain thermoplastic resins other than those exemplified above. For example, since the ethylene/vinyl alcohol copolymer and the low water-absorbing resin usually do not have hot adhesiveness, it is possible to incorporate an adhesive resin in one or both of these resins, or to form an adhesive resin layer between the two resin layers. Such an adhesive resin naturally gets into the blend in the scrap. Furthermore, when the blend is co-extruded with another low water-absorbing resin and/or the ethylene/vinyl alcohol copolymer, it is sometimes the practice to incorporate an adhesive resin in the blend.

Such a carbonyl-containing thermoplastic resin is generally present in an amount of 200 to 0.01 parts by weight, particularly 100 to 0.1 parts by weight, per 100 parts by weight of EVOH and LMR combined.

The blend containing the highly water-absorbing resin incorporated therein may be used in the layer structure shown in FIG. 1, namely in the layer structure which concurrently acts as an adhesive layer. Alternatively, as show in FIG. 2, it is possible to provide separate adhesive resin layers 6 and 6' and interpose layers 5 and 5' of the blend having the highly water-absorbing resin incorporated therein between the adhesive resin layers 6 and 6' and the moisture-resistant resin layers 3 and 4, respecitvely.

Needless to say, the invention is not limited to these specific embodiments, and it is possible, for example, to incorporated the highly water-absorbing resin in the moisture-resistant resin exemplified hereinabove or the ethylene/vinyl alcohol copolymer and use the resulting mixture as an intermediary layer.

In an especially preferred embodiment of this invention, a layer of a composition containing the highly water-absorbing resin particles is provided as a structure sandwiched by a plurality of moisture-resistant resin layers.

Figure 2:
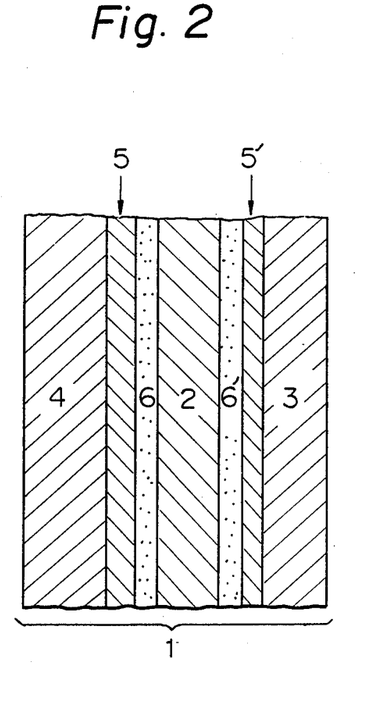
FIG. 2 is a view showing another embodiment of the sectional structure of the plastic container of the invention.

In this embodiment, one of the moisture-resistant resin layers may be the adhesive resin layer 6 (or 6') as shown in FIG. 2.

Figure 3:
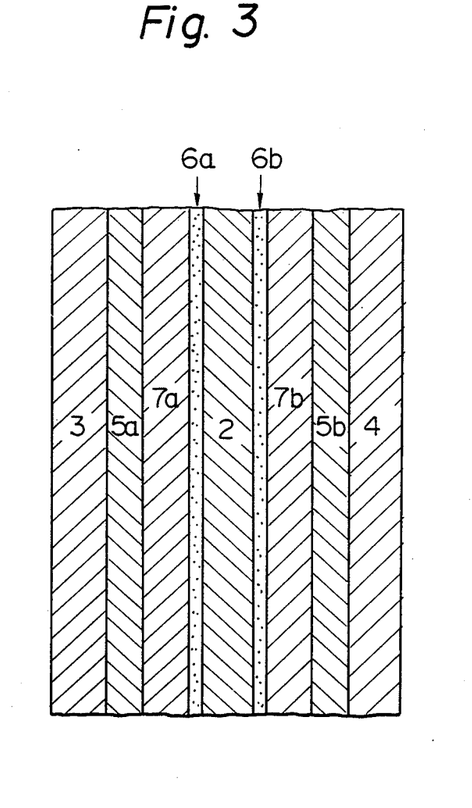
FIG. 3 is a sectional view of the multilayer plastic container of the invention whose wall is composed of a gas-barrier layer 2 containing an ethylene/vinyl alcohol copolymer, adhesive layers 6a and 6b, moisture-resistant resin layers 3, 7a, 7b and 4, and layers 5a and 5b of a composition containing particles of a highly water-absorbing resin.

In the embodiment shown in FIG. 3, laminated structures 3, 5a, 7a (4, 5b, 7b) are provided on both sides of the gas-barrier layer 2, and the moisture-resistant resin inner layers 7a(7b) are bonded to the gas-barrier layer 2 through the adhesive resins layers 6a(6b), respectively.

According to this embodiment of the invention, deleterious effects of moisture on the ethylene/vinyl alcohol copolymer are more remarkably avoided during storage of the container and in retorting or hot filling by providing the layers 5a(5b) containing the highly water-absorbing resin so as to be sandwiched between multiple moisture-resistant resin layers 3 and 7a (4 and 7b), respectively. As a result, the reduction of the gas-barrier property of the container can be markedly inhibited. The highly water-absorbing resin-containing layer provided adjacent to the EVOH layer will act effectively for permitting adsorption of permeated steam in a normal condition. But under retorting conditions, moisture and water absorption of the EVOH layer proceeds, and this is considered as the reason why the reduction of the gas barrier property of the EVOH layer after retorting cannot be inhibited.

In the above embodiment of the present invention, the provision of the moisture-resistant resin layer (adhesive layer) between the highly water-absorbing resin-containing layer and the EVOH layer prevents the occurrence of competitive adsorption between the highly water-absorbing layer and the EVOH layer. On the other hand, steam which has permeated through the moisture-resistant resin surface layer is effectively adsorbed to or absorbed by the highly water-absorbing resin isolated from the EVOH layer through the moisture-resistant resin. Consequently, the degradation of the gas-barrier property of the EVOH layer can be more effectively prevented.

In the multilayer container of this invention, the ratio of the thicknesses of the individual layers may be varied widely. Preferably, the thickness ratio between the LMR layer and the EVOH layer is generally from 1:1 to 100:1, especially from 2:1 to 80:1. The thickness ratio between the EVOH layer and the highly water-absorbing resin-containing layer is preferably from 20:1 to 1:20, especially from 15:1 to 1:15. Desirably, the LMR layer having a thickness of at least 0.5 micrometers, especially 1 to 500 micrometers, is provided between the EVOH layer and the highly water-absorbing resin-containing layer.

The container of this invention can be produced by a method known per se except that the layer construction of the container is designed as described above.

In multilayer co-extrusion, the individual resins are melted and kneaded in separate extruders, and then extruded into a given form through a multilayer multiple-membered die such as a T-die or a circular die. Lamination methods such as dry lamination, sandwich lamination and extrusion coating may be employed. The molded product may assume the form of a parison for formation of films, sheets, bottles or tubes, or a preform for formation of pipes, bottles or tubes. A bottle may be easily formed from the parison, pipe or preform by pinching off the extrudate by a pair of split molds, and blowing a fluid into the inside of the extrudate. A stretch blow-molded bottle or the like can be obtained by cooling the pipe or preform, heating it to a streching temperature, stretching it axially, and at the same time, blow-stretching it circumferentially by a fluid pressure. A packaging container in the form of a cup, a tray, etc. can be obtained by subjecting the film or sheet to vacuum forming, pressure forming, bulge forming or plug assist molding.

The multilayer film may be formed into a bag-like packaging container (pouch) by laying such multilayer films in a bag form, or folding one such film in a bag form and heat-sealing the marginal portions.

The following examples illustrate the present invention more specifically.

EXAMPLE 1

An elliptical bottle was molded which had a symmetrical 5-layered laminated structure composed of an inner and an outer layer of polypropylene (Mitsubishi Noblen BC-8C, a product of Mitsubishi Petrochemical Industries, Ltd.), an interlayer of an ethylene/vinyl alcohol copolymer (Eval-F, a product of Kuraray Inc.) and adhesive layers of acid-modified polypropylene (MODIC P-300F, a product of Mitsubishi Petrochemical Industries, Ltd.). The construction ratio of the outer layer:adhesive layer:interlayer:adhesive layer:inner layer was 10:0.5:1:0.5:10. The bottle had an average wall thickness of about 600 microns and an inner capacity of 280 cc.

The inner and outer layers were respectively extruded by an extruder having a metering-type screw with an L/D ratio of 22. The interlayer was extruded by a similar extruder having a diameter of 40 mm and an L/D of 20. The adhesive layers were each extruded by a similar extruder having a diameter of 32 mm and an L/D of 20. The die temperature was 190° C.

A highly water-absorbing resin of the polyacrylic acid type (AQUAKEEP 10SH, a product of Seitetsu Chemical Co., Ltd.) was dry-blended in various proportions with the aforesaid adhesive resin by a Henschel mixer, and the mixture was fully dried. By using the blend as the adhesive layers, a bottle similar to the above was produced under the same conditions as above. The highly water-soluble resin used had a particle diameter smaller than 150 mesh.

The bottles obtained were each retorted at 120° C. for 30 minutes, and the oxygen permeability of each of the bottles was measured by the following method.

A small amount of distilled water was put in the bottle, and while the inside of the bottle was maintained at a relative humidity of 100%, the inside of the bottle was purged with nitrogen gas in vacuum. The bottle was then sealed up by a heat-seal closure containing an aluminum foil and being impermeable to oxygen. A rubber piece for an injection opening in gas chromatography was attached to the closure by a silicone-type adhesive. The bottle was stored for one week in a constant temperature-constant humidity vessel kept at 37° C. and 80% RH. Then, the concentration of oxygen which permeated into the inside of the bottle was determined by gas chromatography. The oxygen gas permeability ($Q_{02}$) at 37° C. and at 100% RH inside the bottle and 60% RH outside the bottle was calculated in accordance with the following equation. The results are shown by average values obtained for 3 bottles.

$$Q_{02} = \frac{m \times \frac{C_t}{100}}{t \times O_p \times A} \text{ (cc/m}^2 \cdot \text{day} \cdot \text{atm)}$$

wherein m: the amount (ml) of nitrogen gas filled in the bottle,
t: the period (days) during which the bottle was stored in the constant temperature-constant humidity vessel,
$C_t$: the concentration (vol. %) of oxygen in the bottle after the lapse of t days,
A: the effective surface area (m$^2$) of the bottle,
$O_p$: the partial pressure of oxygen gas (=0.209 atm.)

For comparison, the $Q_{02}$ values of the bottles not retorted were also measured. The results are shown in Table 1.

TABLE 1

| Content of the highly water-absorbing resin (wt. %) | Retorting | $Q_{02}$ at 37° C. and 60% RH (cc/m$^2$ · day · atm) |
|---|---|---|
| 0 | yes | 105 |
|   | no | 10 |
| 1 | yes | 45 |
|   | no | 10 |
| 2 | yes | 22 |
|   | no | 9 |
| 5 | yes | 15 |
|   | no | 8 |
| 20 | yes | 10 |
|   | no | 7 |
| 35 | yes | 8 |
|   | no | 6 |
| 40 | yes | 8 |
|   | no | 6 |

The above results show that as the amount of the highly water-absorbing resin increases, the deleterious effect caused by retorting decreases, and that the oxygen barrier property increases even when no retorting is carried out.

When the content of the highly water-soluble resin was 40% by weight, the function of the water-absorbing resin-containing layer as the adhesive decreased, and some retorted samples underwent delamination in a falling test from a height of 1 m. When the content of the highly water-absorbing resin was not more than 35% by weight, none underwent delamination in the falling test. When the content of the highly water-absorbing resin was 50% by weight, most of the samples underwent delamination in the falling test.

EXAMPLE 2

In the same way as in Example 1, the adhesive was dry-blended with 20% by weight of each of highly water-absorbing resins having various sizes, and similar bottles were molded. Immediately after retorting at 120° C. for 30 minutes, water was filled in each bottle, and the mouth portion was sealed up with a heat seal closure containing an aluminum foil. The bottles were then subjected to a falling test comprising ten fallings onto a concrete surface from a height of 1 m. Three bottles were tested for each size of the water-absorbing resin. The results are shown in Table 2.

TABLE 2

| Size of the highly water-absorbing resin | Condition of the bottles after the testing |
|---|---|
| 8 mesh or greater | Delamination occurred in all three bottles |
| 9–14 mesh | One bottle underwent delamination after three fallings |
| 16 mesh or smaller | No delamination occurred in all three bottles |

From the above results, it has been found that the size of the highly water-absorbing resin is desirably 9 mesh (mesh opening, 1.981 mm) or smaller.

EXAMPLE 3

A sheet having a thickness of 0.8 mm was prepared from a laminate composed of polypropylene (Mitsubishi Noblen MA-6, a product of Mitsubishi Petrochemical Industries, Ltd.) as an innermost and an outermost layer, ethylene/vinyl alcohol copolymer (Eval-F, a product of Kuraray Inc.) as an interlayer, a scrap of the molded article of the laminate as an inner and an outer layer, and acid-modified polypropylene (MODIC, P-300F, a product of Mitsubishi Petrochemical Industries, Ltd.) as adhesive layers between the interlayer and the inner and outer layers, respectively. The construction ratio of innermost layer:inner layer:adhesive layer:interlayer:adhesive layer:outer layer:outermost layer was 20:25:3:4:3:25:20.

The temperature of the head of an extruder was 200° C. for polypropylene, 175° C. for the scrap, 210° C. for acid-modified polypropylene, and 200° C. for ethylene/vinyl alcohol copolymer.

The above scrap had been left to stand at 20° C. and 65% RH for 20 days. Multilayer sheets were also prepared under the above conditions by using blends obtained by dry-blending the highly water-absorbing resin of Example 1 in various proportions with the scrap for 15 minutes by a Henschel mixer.

The state of sheet extrusion was observed, and the results as shown in Table 3.

TABLE 3

| Sheet | Proportion of the highly water-absorbing resin (wt. %) | State of extrusion |
|---|---|---|
| A | 0 | Foaming and yellowing occurred |
| B | 1 | Some foaming and yellowing occurred |
| C | 2 | Foaming and yellowing occurred hardly |
| D | 5 | No foaming nor yellowing occurred |
| E | 20 | No foaming nor yellowing occurred |

These results show that by mixing the highly water-absorbing resin with the scrap, the water content of the ethylene/vinyl alcohol copolymer decreases, and its degradation can be prevented.

The sheets B, C, D and E above were each reground, and left to stand for 20 days at 20° C. and 65% RH. Using the resulting scraps (regrinds), multilayer sheets were prepared under the same conditions as above. The results are shown in Table 4.

TABLE 4

| Sheet | State during extrusion |
|---|---|
| B | Some foaming and yellowing occurred |
| C | Foaming and yellowing hardly occurred |
| D | No foaming nor yellowing occurred |
| E | No foaming nor yellowing occurred |

The results show that even when the scrap contains the highly water-absorbing resin and the water-absorbing resin holds some moisture absorbed, foaming and yellowing hardly occur, and thus the water absorbing or water holding ability of the highly water-absorbing resin is very superior.

EXAMPLE 4

A multilayer film was prepared by using a stretched polypropylene film (thickness 20 microns, Torayfan BO, a product of Toray) as an outer layer, a film of an ethylene/vinyl alcohol copolymer (thickness 17 microns, EVA1 F, Kuraray Inc.) as an interlayer, an unstretched polypropylene film (thickness 50 microns, Torayfan NO, Toray Inc.) as an interlayer and a urethane-type adhesive (AD503, curing agent CAT-10, Toyo Morton Co., Ltd.) dissolved in a mixture of toluene/ethyl acetate (50/50), and curing the product.

Separately, 30%, as solids, of the highly water-absorbing resin described in Example 1 having a size smaller than 400 mesh was mixed with the aforesaid adhesive solution. Using this adhesive solution, a multilayer film was prepared in the same way as above.

Each of the multilayer films was formed into a bag, and retorted at 120° C. for 30 minutes. Immediately then, a small amount of distilled water was put in the bag, and the inside of the bag was purged with nitrogen. The mouth portion was heat-sealed. A rubber piece for an injection opening in gas chromatography was attached to the bag by using a silicone-type adhesive. The bag was stored for one week in a constant temperature-constant humidity vessel kept at 30° C. and 60% RH. Thereafter, the concentration of oxygen which permeated through the bag was determined by gas chromatography. The oxygen gas permeability ($Q_{O2}$) at 30° C. and 60% RH was calculated in accordance with the equation given in Example 1. The results are shown by average values for three bags. For comparison, $Q_{O2}$ values of non-retorted bags were also measured. The results are shown in Table 5.

TABLE 5

| Highly water-absorbing resin | Retorting | $Q_{O2}$ at 30° C. and 60% RH (cc/m² · day · atm) |
|---|---|---|
| Used | Yes | 12 |
| | No | 8 |
| Not used | Yes | 120 |
| | No | 10 |

The results show that the bag containing the highly water-absorbing resin had enhanced gas-barrier property under ordinary storage conditions, and this property was maintained even after retorting.

COMPARATIVE EXAMPLE 1

Bottles were produced in the same way as in Example 1 except that silica gel was used instead of the highly water-absorbing resin. The oxygen permeabilities of the retorted bottles were measured. The results are shown in Table 6.

TABLE 6

| Silica gel content (wt. %) | $Q_{O_2}$ at 37° C. and 60% RH (cc/m² · day · atm) |
|---|---|
| 1 | 90 |
| 2 | 80 |
| 5 | 40 |
| 20 | 30 |
| 35 | 30 |

A comparison of these results with those obtained in Example 1 shows that the highly water-absorbing resin has a much greater water-absorbing effect than silica gel.

EXAMPLE 5

A 4-kind 9-layer sheet (thickness 400 microns) of the structure shown in FIG. 2 was prepared by co-extruding polyethylene terephthalate (TR-4550, a product of Teijin Ltd.) as inner and outer layers, an ethylene/vinyl alcohol copolymer (Eval F, a product of Kuraray Inc.) as an interlayer, a layer of a blend of polyethylene terephthalate with a highly water-absorbing resin (AQUA-KEEP 10SH, a product of Seitetsu Chemical Co., Ltd.) as a layer between the inner layers or between the outer layers, and a copolyester (a copolymer derived from terephthalic acid, isophthalic acid, dimeric acid, 1,4-butanediol, diethylene glycol, etc.) as an adhesive layer between the interlayer and the inner or outer layer.

An extruder including a full flight-type screw having a diameter of 65 mm and an effective length of 1430 mm was used for the outer layers. An extruder including a full flight-type screw having a diameter of 40 mm and an effective length of 1000 mm was used for the adhesive layers. An extruder including a screw having a diameter of 38 mm and an effective length of 950 mm was used for the interlayer and the highly water-soluble resin blend layer.

The layer construction of the sheet was outer layer:blend layer:outer layer:adhesive layer:interlayer:adhesive layer:inner layer:blend layer:inner layer = 80μ:25μ:80μ:5μ:20μ:5μ:80μ:25μ:80μ.

Sheets were prepared by varying the proportion of the highly water-absorbing resin blended in the highly water-absorbing resin blend layer, and stored in a constant temperature-constant humidity vessel (NEW LH-20-01, made by Nagano Kagaku Kikai Seisakusho K.K.) at 50° C. and 90% RH.

The oxygen permeability of each of the sheets was measured at 27° C. and 100% RH by using Oxytran-100 (Modern Control Co., Ltd.). The results are shown in Table 7.

TABLE 7

| Proportion of the highly water-absorbing resin (wt. %) | Period of Storage at 50° C. and 90% RH | Oxygen permeability at 37° C. and 100% RH (cc/m² · day · atm) |
|---|---|---|
| 0 | 1 | 8.3 |
|  | 2 | 9.1 |
|  | 3 | 9.1 |
| 1 | 1 | 7.8 |
|  | 2 | 8.3 |
|  | 3 | 9.0 |
| 2 | 1 | 4.6 |
|  | 2 | 5.2 |
|  | 3 | 6.0 |
| 7 | 1 | 3.0 |
|  | 2 | 3.5 |
|  | 3 | 3.9 |
| 23 | 1 | 1.5 |
|  | 2 | 1.7 |

TABLE 7-continued

| Proportion of the highly water-absorbing resin (wt. %) | Period of Storage at 50° C. and 90% RH | Oxygen permeability at 37° C. and 100% RH (cc/m² · day · atm) |
|---|---|---|
|  | 3 | 1.8 |
| 30 | 1 | 1.4 |
|  | 2 | 1.5 |
|  | 3 | 1.5 |
| 38 | 1 | 1.4 |
|  | 2 | 1.5 |
|  | 3 | 1.5 |

The sheet which contained the highly water-absorbing resin in a blending proportion of 38% had a low adhesion strength between layers. When it exceeds 40%, the blend layer scarcely adhered to the adjoining layers, and the sheets could not be evaluated.

The results given in Table 7 show that by providing the highly water-absorbing resin layer, the moisture absorption of the ethylene/vinyl alcohol layer can be prevented, and its gas barrier property can be maintained.

EXAMPLE 6

Sheets were produced in the same way as in Example 5 except that instead of the blended layer of the highly water-absorbing resin and polyethylene terephthalate, there was used a layer of a blend of the highly water-absorbing resin described in Example 5 with a scrap obtained by regrinding the sheet obtained in Example 5 which contained the water-absorbing resin in a blending proportion of 23%. The results are shown in Table 8.

TABLE 8

| Proportion of the highly water-absorbing resin blended based on the scrap (wt. %) | Period of storage at 50° C. and 90% RH (days) | Oxygen permeability at 37° C. and 100% RH (cc/m² · day · atm) |
|---|---|---|
| 0 | 1 | 4.5 |
|  | 2 | 5.2 |
|  | 3 | 5.8 |
| 23 | 1 | 1.4 |
|  | 2 | 1.6 |
|  | 3 | 1.7 |

It is seen that the use of the scrap for blending with the highly water-absorbing resin gives rise to no problem.

In Table 8, the oxygen permeability at a blending proportion of 0% is slightly lower than the value given in Table 7. This is presumably because the reground scrap contained the highly water-absorbing resin.

The results shown in Table 8 were obtained with sheets which were obtained by extrusion after fully drying the scrap. Similarly, sheets were formed by extrusion in the same way as above using the scrap which had been left to stand for 20 days at 20° C. and 65% RH. The scrap and the highly water-absorbing resin had been dry-blended for 15 minutes by a Henschel mixer. The state during the extrusion was observed, and the results are shown in Table 9.

TABLE 9

| Proportion of the highly water-absorbing resin based on the scrap (wt. %) | State at the time of extrusion |
|---|---|
| 0 | Foaming and yellowing |

TABLE 9-continued

| Proportion of the highly water-absorbing resin based on the scrap (wt. %) | State at the time of extrusion |
|---|---|
| | occurred |
| 23 | Foaming and yellowing did not occur |

The results show that by mixing the highly water-absorbing resin with the scrap, the water content of the ethylene/vinyl alcohol copolymer in the scrap decreases and the degradation of ethylene/vinyl alcohol copolymer can be prevented.

EXAMPLE 7

The various sheets described in Example 5 were each molded into a rectangular tray having a depth of 2 cm, a longitudinal size of 8 cm and a lateral size of 10.5 cm by ordinary plug assist molding at 110° C., and then heat-set for 30 minutes in another mold maintained at 180° C.

Each of the trays was retorted at 120° C. for 30 minutes, and the oxygen permeability of the tray was measured in the same way as set forth in Example 1 except that the tray sample was used instead of the bottle sample described in Example 1. For comparison, the oxygen permeabilities of the trays not subjected to retorting were also measured. The results are shown in Table 10.

TABLE 10

| Proportion of the highly water-absorbing resin (wt. %) | Retorting | $Q_{O_2}$ at 37° C. and 60% RH (cc/m$^2$ · day · atm) |
|---|---|---|
| 0 | Yes | 9.2 |
| | No | 1.5 |
| 1 | Yes | 8.7 |
| | No | 1.8 |
| 2 | Yes | 5.3 |
| | No | 1.5 |
| 7 | Yes | 4.0 |
| | No | 1.8 |
| 23 | Yes | 2.5 |
| | No | 1.6 |
| 30 | Yes | 1.7 |
| | No | 1.6 |
| 38 | Yes | 1.8 |
| | No | 1.7 |

The above results show that even under rigorous conditions such as in retorting, the provision of the highly water-absorbing resin-containing layer makes it possible to maintain the gas-barrier property of the container.

EXAMPLE 8

A multilayer film was prepared by using a stretched polyester film (Ester Film ® E5100, a product of Toyobo Ltd., thickness 25 micrometers) as an outermost layer, a stretched polypropylene film (Torayfan BO ®, a product of Toray Inc.; thickness 20 micrometers) as an outer layer, a film of an ethylene/vinyl alcohol copolymer (Eval-F ®, a product of Kuraray Inc.; thickness 17 micrometers) as an interlayer, the same stretched polyester film as above as an inner layer, an unstretched polypropylene film (Torayfan NO ®, a product of Toray Inc.; thickness 50 micrometers) as an innermost layer, and a urethane adhesive A(AD 503, Toyo Motron Co., Ltd.; curing agent CAT-10) dissolved in a 50:50 mixture of toluene and ethylene acetate), and performing curing.

The highly water-absorbing resin described in Example 5 having a size smaller than 400 mesh was added in an amount of 30% as solids to the adhesive solution indicated above. By using the resulting mixture (B) and performing curing in the same way as above, multilayer films were prepared. The multilayer films are classified as shown below by the position of the adhesive B containing the highly water-absorbing resin in the lamiante.

TABLE 11

| | Adhesives used | | | |
|---|---|---|---|---|
| | Between the outermost layer and the outer layer | Between the outer layer and the interlayer | Between the interlayer and the inner layer | Between the inner layer and the innermost layer |
| (i) | A | B | B | A |
| (ii) | B | A | A | B |
| (iii) | A | A | A | A |
| (iv) | B | B | B | B |

Each of the multilayer films was formed into a bag, and retorted at 120° C. for 30 minutes. Immediately then, a small amount of distilled water was put in the bag, and the inside of the bag was purged with nitrogen. The mouth portion was heat-sealed. A rubber piece for an injection opening in gas chromatography was attached to the bag by a silicone-type adhesive. The bag was stored for one week in a constant temperature-constant vessel kept at 30° C. and 60% RH, and the concentration of oxygen which permeated into the bag was determined by gas chromatography. The oxygen gas permeability ($Q_{O_2}$) at 30° C. and 60% RH was calculated in accordance with the method indicated in Examples 1 and 7. The results obtained are shown by average values for 3 bags. For comparison, the oxygen permeability values of bags not retorted were also measured. The results are shown in Table 12.

TABLE 12

| Type of the bag | Retorting | $Q_{O_2}$ at 30° C. and 60% RH (cc/m$^2$ · day · atm) |
|---|---|---|
| (i) | yes | 5.3 |
| | no | 0.5 |
| (ii) | yes | 0.3 |
| | no | 0.3 |
| (iii) | yes | 16.0 |
| | no | 1.0 |
| (iv) | yes | 0.5 |
| | no | 0.3 |

The arrangement of the adhesive layer containing the highly watrer-absorbing resin is increasingly effective for gas barrier property in the sequence (i)→(iv)→(ii). When only the adhesive agent not containing the highly water-absorbing resin is used, the barrier property is abruptly reduced as a result of retorting.

The results show that the highly water-absorbing resin acts more effectively when sandwiched by the moisture-resistant resin layers than when arranged adjacent to the ethylene/vinyl alcohol copolymer layer.

EXAMPLE 9

A 4-kind 9-layer pipe of the structure indicated in FIG. 2 was prepared from the same layer-forming materials as described in Example 5 by melt extrusion. The pipe was pre-blow-molded in a split mold to form a bottomed preform having an inside diameter of 27.7 mm, a length of 138 mm and an average wall thickness of 3.5 mm. The bottomed preform was heated to a surface temperature of 110° C. by an infrared heater, and biaxially stretched and blow-molded to form a bottle having an average wall thickness of 400 micrometers, an inner capacity of 1030 cc and a weight of 36 g. The layer construction of the barrel portion was the same as in Example 5. The adhesive layer contained 23% by weight of the highly water-absorbing resin.

A similar bottle was formed in the same way as above except that the adhesive having 23% by weight of silica gel blended instead of the highly water-absorbing resin was used.

The bottles were each stored at 50° C. and 90% RH in the same way as in example 5, and then the oxygen gas permeability ($Q_{O2}$) values of these bottles in an atmosphere kept at 37° C. and 60% RH were calculated by the same method as described in Example 1. The results are shown in Table 13.

TABLE 13

| Blend | Period of storage at 50° C. and 90% RH | $Q_{O2}$ at 37° C. and 60% RH ($cc/m^2 \cdot day \cdot atm$) |
|---|---|---|
| Highly water-absorbing resin | 0 | 1.3 |
| | 5 | 1.3 |
| Silica gel | 0 | 1.5 |
| | 5 | 3.8 |

The above results show that the water-absorbing agent (highly water-absorbing resin) is more effective than silica gel (desiccant).

What is claimed is:

1. A multilayer plastic container for packaging formed of a coextruded laminate comprising a gas-barrier layer containing an ethylene/vinyl alcohol copolymer and inner and outer surface layers of a moisture-resistant thermoplastic resin provided so as to sandwich the gas-barrier layer, said laminate further comprising intermediary layers between the gas-barrier layer and each of said moisture-resistant resin layers, each said intermediary layer containing from about 2 to 40% by weight, based on the total weight of said layer, of particles of crosslinked polyacrylic acid or its salt as a highly water-absorbing resin dispersed in a thermoformable thermoplastic resin medium wherein the highly water-absorbing resin is essentially water-insoluble and has the ability to absorb 20 to 1000 times its own weight of water.

2. The container of claim 1 wherein the highly water-absorbing resin has a particle diameter of not more than 1000 micrometers.

3. The container of claim 1 wherein the highly water-absorbing resin is present in an amount of 35 to 5% by weight based on the entire weight of the intermediary layer.

4. The container of claim 1 wherein the ethylene/vinyl alcohol copolymer has an ethylene content of 20 to 60 mole % and a degree of saponification of at least 96%.

5. The container of claim 1 wherein the moisture-resistant resin has a water absorption, measured in accordance with ASTM D570, of not more than 0.5%.

6. The container of claim 1 wherein the moisture-resistant resin is polyethylene, polypropylene, or a copolymer thereof.

7. The container of claim 1 wherein the moisture-resistant resin is a thermoplastic polyester mainly containing ethylene terephthalate units.

8. The container of claim 1 wherein the thermoplastic resin medium of each of said intermediary layers comprise an adhesive resin composed of a thermoplastic resin containing 1 to 700 milli-equivalents/100 g of resin of the carbonyl group based on a carboxylic acid, a carboxylic acid anhydride, a carboxylic acid salt, a carboxylic acid amide or a carboxylic acid ester.

9. The container of claim 1 wherein the thermoplastic resin medium of each of said intermediary layers comprises a blend of an ethylene/vinyl alcohol copolymer and a moisture-resistant resin.

10. The container of claim 9 wherein in said blend the ethylene/vinyl alcohol copolymer and the moisture resistant resin are present in a weight ratio of from 1:2000 to 1:3.

11. The container of claim 1 wherein a coextruded laminated structure composed of a layer of a composition containing particles of the highly water-absorbing resin in the thermoformable thermoplastic resin medium and a plurality of moisture resistant resin layers sandwiching the layer of said composition is present on at least one side of the gas-barrier layer.

12. The container of claim 1 wherein the highly water-absorbing resin in each said intermediary layer is present in an amount of from 35 to 5% by weight based on the entire weight of each said intermediary layer.

13. The container of claim 9 wherein said blend comprises recycled scrap material.

14. The container of claim 13 wherein said blend further comprises an adhesive resin in an amount of from about 100 to 0.1 parts by weight, based on the combined weights of the ethylene/vinyl alcohol copolymer and the moisture resistant resin.

15. A multilayer plastic container useful in packaging of oxygen-sensitive substances, the walls of said container comprising a coextruded laminate structure including a gas-barrier layer containing an ethylene vinyl alcohol copolymer, inner and outer layers of a moisture-resistant thermoplastic resin on either side of the gas-barrier layer, intermediary layers between the gas-barrier layer and each of said moisture-resistant layers, each of said intermediary layers comprising a thermoformable thermoplastic resin medium and dispersed therein from 2 to 40% by weight, based on the total weight of the intermediary layer, of particles of crosslinked polyacrylic acid or its salt as a highly water-absorbing resin, said highly water-absorbing resin being essentially water insoluble and having the capacity to absorb 20 to 1000 times its own weight of water, and adhesive layers between and adjoining each of said intermediary layers and said gas-barrier layer.

16. A multilayer plastic container useful in packaging of oxygen-sensitive substances, the walls of said container comprising a gas-barrier layer containing an ethylene/vinyl alcohol copolymer, and on each side thereof a coextruded laminate structure comprising first and second layers of moisture-resistant thermoplastic resin sandwiching therebetween an intermediary layer comprising a thermoformable thermoplastic resin medium and dispersed therein from 2 to 40% by weight, based on the total weight of said intermediate layer, of particles of crosslinked polyacrylic acid or its salt as a highly water-absorbing resin, said highly water-absorbing resin being essentially water-insoluble and having the capacity to absorb 20 to 1000 times its own weight of water, each said laminate structure being bonded to said gas-barrier layer through an adhesive layer.

* * * * *